United States Patent [19]
Kao et al.

[11] Patent Number: 6,136,747
[45] Date of Patent: Oct. 24, 2000

[54] MIXED CATALYST COMPOSITION FOR THE PRODUCTION OF OLEFIN POLYMERS

[75] Inventors: Sun-Chueh Kao; Frederick John Karol, both of Belle Mead, N.J.; Paul Theodore Daniell, Tornado; Gregory Mark Goode, Hurricane, both of W. Va.

[73] Assignee: Union Carbide Chemicals & Plastics Technology Corporation, Danbury, Conn.

[21] Appl. No.: 09/100,811

[22] Filed: Jun. 19, 1998

[51] Int. Cl.[7] ........................................ B01J 31/00
[52] U.S. Cl. .......................... 502/158; 502/114; 502/113; 502/152; 526/943; 526/108; 526/90; 526/99; 526/114; 526/119; 526/153
[58] Field of Search .................... 526/943, 108, 526/90, 99, 114, 119, 153; 502/114, 158, 113, 152

[56] References Cited

U.S. PATENT DOCUMENTS

| | | | |
|---|---|---|---|
| 4,302,565 | 11/1981 | Goeke et al. | 526/88 |
| 4,701,432 | 10/1987 | Welborn, Jr. | 502/113 |
| 5,032,562 | 7/1991 | Lo et al. | 502/111 |
| 5,077,255 | 12/1991 | Welborn, Jr. | 502/104 |
| 5,124,418 | 6/1992 | Welborn, Jr. | 526/114 |
| 5,183,867 | 2/1993 | Welborn, Jr. | 526/114 |
| 5,317,036 | 5/1994 | Brady, III et al. | 523/223 |
| 5,332,706 | 7/1994 | Nowlin et al. | 502/107 |

FOREIGN PATENT DOCUMENTS

| | | |
|---|---|---|
| 0318048 | 5/1989 | European Pat. Off. . |
| 0439964 | 8/1991 | European Pat. Off. . |
| 0447070 | 9/1991 | European Pat. Off. . |
| 0586168 | 3/1993 | European Pat. Off. . |
| 0536104 | 4/1993 | European Pat. Off. . |
| 0536104 A1 | 4/1993 | European Pat. Off. . |
| 0656373 | 6/1995 | European Pat. Off. . |

*Primary Examiner*—David W. Wu
*Assistant Examiner*—Ling Sui Choi
*Attorney, Agent, or Firm*—S. R. Bresch

[57] ABSTRACT

A mixed catalyst composition comprising a) a solid Ziegler-Natta catalyst; b) a liquid single site catalyst; and c) at least one activating cocatalyst is provided. Polymers having a broad or bimodal molecular weight distribution may be made with this catalyst composition.

6 Claims, No Drawings

MIXED CATALYST COMPOSITION FOR THE PRODUCTION OF OLEFIN POLYMERS

The present invention relates to the production of olefin polymers having broadened or bimodal molecular weight distributions. Such olefin polymers are conveniently produced using a catalyst composition comprising: a) a solid Ziegler-Natta catalyst; b) a liquid single site catalyst; and c) at least one activating cocatalyst.

BACKGROUND OF THE INVENTION

A variety of catalyst compositions are known for the production of olefin polymers, including those based on traditional Ziegler-Natta catalysts. More recently, single site catalysts, compounds in which each catalyst composition contains one or only a few kinds of polymerization sites, have gained increased attention. Metallocenes are the most well known type of single site catalysts, and are organometallic coordination complexes containing one or more pi-bonded moieties (i.e., cycloalkadienyl groups) in association with a metal atom from Groups IIIB to VIII or the Lanthanide series of the Periodic Table of Elements. Single site catalysts are typically activated with aluminoxanes or non-coordinating anions when employed to polymerize olefins.

It is commonly believed among those skilled in olefin polymerization that catalyst compositions, particularly when used in heterogeneous polymerization methods such as gas phase polymerization and suspension polymerization, must be supported on an inert carrier to facilitate control of polymer particle size and bulk density. Even when mixed catalyst systems are utilized, both catalysts are supported on an inert carrier. For example, U.S. Pat. Nos. 4,701,432 and 5,077,255 to Welborn, Jr. relate to olefin polymerization catalyst compositions comprising a metallocene and a non-metallocene impregnated on a support. Similarly, EP 0 586 168 A1 discloses a catalyst composition comprising a metallocene complex having polymerizable groups and a Ziegler-Natta catalyst for the preparation of olefins. Preferably, the metallocene complex is in the form of a polymer and the catalyst composition is supported.

It has now been discovered that a particularly effective olefin polymerization catalyst comprises the combination of a heterogeneous, solid Ziegler-Natta catalyst and a homogeneous, liquid single site catalyst along with one or more activating cocatalysts. Polymers having broadened or bimodal molecular weight distributions are advantageously produced. Because the single site catalyst is introduced into the polymerization reactor as a liquid, adjustment of the Ziegler-Natta catalyst/single site catalyst feed ratio is easily accomplished. This in turn allows for better control of polymer molecular weight distribution and other properties. Moreover, the complexities and compatibility issues associated with supporting two catalysts on the same support are avoided. And in contrast to a mixed catalyst system in which the catalysts are supported on separate supports, with the present invention polymer made by each catalyst can grow on a single particle.

SUMMARY OF THE INVENTION

The invention provides a catalyst composition for the polymerization of olefins, comprising: a) a solid Ziegler-Natta catalyst; b) a liquid single site catalyst; and c) at least one activating cocatalyst. The invention also provides a process for the production of olefin polymers, which comprises contacting at least one olefin monomer under polymerization conditions with the above catalyst composition.

DETAILED DESCRIPTION OF THE INVENTION

The catalyst composition comprises a heterogeneous, solid Ziegler-Natta catalyst, a homogeneous, liquid single site catalyst, and at least one activating cocatalyst. Ziegler-Natta catalysts are well known in the art, and include the following categories:

A. Titanium based catalysts such as those described in U.S. Pat. Nos. 4,302,565; 4,376,062; 4,379,758. Typically these are magnesium/titanium/electron donor complexes used in conjunction with an organoaluminum cocatalyst;

B. Chromium based catalysts such as those described in U.S. Pat. Nos. 3,324,095 and 3,535,297.

C. Vanadium based catalysts such as vanadium oxychloride and vanadium acetylacetonate, such as described in U.S. Pat. No. 5,317,036.

Preferred are titanium/magnesium Ziegler-Natta catalysts, such as those having the formula:

$$Mg_m Ti(OR)_n X_p [ED]_q \qquad (I)$$

wherein

ED is an electron donor;

$0.5 \leq m \leq 56$, preferably $1.5 \leq m \leq 5$;

n is 0, 1, or 2;

$2 \leq p \leq 116$, preferably $6 \leq p \leq 14$;

$2 \leq q \leq 85$, preferably $4 \leq q \leq 11$;

R is a $C_1$ to $C_{14}$ aliphatic or aromatic hydrocarbon radical, or COR' wherein R' is a $C_1$ to $C_{14}$ aliphatic or aromatic hydrocarbon radical; and X is selected from the group consisting of Cl, Br, I, and mixtures thereof.

Catalysts of formula I are described in detail in U.S. Pat. No. 4,302,565.

The Ziegler-Natta catalyst is used in heterogeneous, solid form, i.e., as a solid itself, in supported form, in prepolymerized form, or spray dried. Preferably, the Ziegler-Natta catalyst is supported on an inert carrier material. Methods of catalyst impregnation are well known in the art. Any of these methods may be used.

A supported Ziegler-Natta catalyst of formula I may be made by first dissolving a titanium compound of the formula $$Ti(OR)_a X_b \qquad (II)$$

wherein R and X have the meanings above and a is 0, 1, or 2, b is 1 to 4 inclusive and a+b=3 or 4; and a magnesium compound of the formula $$MgX_2 \qquad (III)$$

wherein X has the meaning above, in an electron donor, which is an organic compound that is a liquid at 25° C. in which the titanium compound and the magnesium compound are soluble. The resulting catalyst, i.e., formula I above, is isolated, and then dissolved in further electron donor compound. Next it is mixed with inert carrier material to impregnate the catalyst into the carrier material. The electron donor solvent is then removed by drying at temperatures of 70° C. or above. Alternatively, the carrier material may be impregnated with the catalyst by mixing the electron donor compound solution of titanium compound and magnesium compound with the carrier material, and then removing the electron donor compound by drying of washing.

Useful titanium compounds of formula II include $TiCl_3$, $TiCl_4$, $Ti(OCH_3)Cl_3$, $Ti(OC_6H_5)Cl_3$, $Ti(OCOCH_3)Cl_3$, and $Ti(OCOC_6H_5)Cl_3$.

Useful magnesium compounds of formula III include $MgCl_2$, $MgBr_2$ and $MgI_2$. Anhydrous $MgCl_2$ is especially preferred.

Useful electron donor compounds include such compounds as alkyl esters of aliphatic and aromatic carboxylic acids, aliphatic ethers, cyclic ethers and aliphatic ketones. Preferred are alkyl esters of $C_1$ to $C_4$ saturated aliphatic carboxylic acids; alkyl esters of $C_7$ to $C_8$ aromatic carboxylic acids; $C_2$ to $C_8$, preferably $C_3$ to $C_4$, aliphatic ethers; $C_3$ to $C_4$ cyclic ethers, preferably $C_4$ cyclic mono-or di-ethers; and $C_3$ to $C_6$, preferably $C_3$ to $C_4$, aliphatic ketones. Most preferred are methyl formate, ethyl acetate, butyl acetate, ethyl ether, hexyl ether, tetrahydrofuran, dioxane, acetone and methyl isobutyl ketone.

The electron donor compounds can be used individually or in combinations thereof.

To make a Ziegler-Natta catalyst of formula I, about 0.5 to about 56, preferably about 1 to 10, moles of magnesium compound are used per mole of titanium compound. About 2 to about 85, preferably about 3 to about 10, moles of electron donor compound per mole of Ti are used.

The single site catalyst may be a metallocene, i.e., an organometallic coordination complex of one or more π-bonded moieties (i.e., cycloalkadienyl groups) in association with a metal atom from Groups IIIB to VIII or the Lanthanide series of the Periodic Table of Elements. Bridged and unbridged mono-, di-, and tri-cycloalkadienyl/metal compounds are the most common metallocenes, and generally are of the formula:

$$(L)_y R^1_z (L')MX_{(x-y-1)} \qquad (IV)$$

wherein M is a metal from groups IIIB to VIII or a rare earth metal of the Periodic Table; L and L' are the same or different and are π-bonded ligands coordinated to M, preferably cycloalkadienyl groups such as cyclopentadienyl, indenyl, or fluorenyl groups optionally substituted with one or more hydrocarbyl groups containing 1 to 20 carbon atoms; $R^1$ is selected from the group consisting of $C_1$–$C_4$ substituted or unsubstituted alkylene radicals, dialkyl or diaryl germanium or silicon groups, and alkyl or aryl phosphine or amine radicals bridging L and L'; each X is independently hydrogen, an aryl, alkyl, alkenyl, alkylaryl, or arylalkyl radical having 1–20 carbon atoms, or a hydrocarboxy radical having 1–20 carbon atoms; y is 0, 1, or 2; x is 1, 2, 3, or 4 depending upon the valence state of M; z is 0 or 1 and is 0 when y is 0; and x-y≧1.

Illustrative but non-limiting examples of metallocenes represented by formula II are dialkyl metallocenes such as bis(cyclopentadienyl)titanium dimethyl, bis(cyclopentadienyl)titanium diphenyl, bis(cyclopentadienyl)zirconium dimethyl, bis(cyclopentadienyl)zirconium diphenyl, bis(cyclopentadienyl)hafnium methyl and diphenyl, bis(cyclopentadienyl)titanium di-neopentyl, bis(cyclopentadienyl)zirconium di-neopentyl, bis(cyclopentadienyl)titanium dibenzyl, bis(cyclopentadienyl)zirconium dibenzyl, bis(cyclopentadienyl)vanadium dimethyl; the mono alkyl metalocenes such as bis(cyopentadienyl)titanium methyl chloride, bis(cyclopentadienyl)titanium ethyl chloride, bis(cyclopentadienyl)titanium phenyl chloride, bis(cyclopentadienyl)zirconium methyl chloride, bis(cyclopentadienyl)zirconium ethyl chloride, bis(cyclopentadienyl)zirconium phenyl chloride, bis(cyclopentadienyl)titanium methyl bromide; the trialkyl metallocenes such as cyclopentadienyl titanium trimethyl, cyclopentadienyl zirconium triphenyl, and cyclopentadienyl zirconium trineopentyl, cyclopentadienyl zirconium trimethyl, cyclopentadienyl hafnium triphenyl, cyclopentadienyl hafnium trineopentyl, and cyclopentadienyl hafnium trimethyl; monocyclopentadienyl titanocenes such as pentamethylcyclopentadienyl titanium trichloride, pentaethylcyclopentadienyl titanium trichloride, bis(pentamethylcyclopentadienyl)titanium diphenyl; the carbene represented by the formula bis(cyclopentadienyl)titanium=CH2 and derivatives of this reagent; substituted bis(cyclopentadienyl)titanium (IV) compounds such as bis(indenyl)titanium diphenyl or dichloride, bis(methylcyclopentadienyl)titanium diphenyl or dihalides; dialkyl, trialkyl, tetraalkyl and pentaalkyl cyclopentadienyl titanium compounds such as bis(1,2-dimethylcyclopentadienyl)titanium diphenyl or dichloride, bis(1,2-diethylcyclopentadienyl)titanium diphenyl or dichloride; silicon, phosphine, amine or carbon bridged cyclopentadiene complexes such as dimethyl silyldicyclopentadienyl titanium diphenyl or dichloride, methyl phosphine dicyclopentadienyl titanium diphenyl or dichloride, methylenedicyclopentadienyl titanium diphenyl or dichloride and other dihalide complexes, and the like, as well as isopropyl(cyclopentadienyl)(fluorenyl)zirconium dichloride, isopropyl(cyclopentadienyl)(octahydrofluorenyl)zirconium dichloride, diphenylmethylene(cyclopentadienyl)(fluorenyl)zirconium dichloride, diisopropylmethylene(cyclopentadienyl)(fluorenyl)zirconium dichloride, disobutylmethylene(cyclopentadienyl)(fluorenyl)zirconium dichloride, ditertbutylmethylene(cyclopentadienyl)(fluorenyl)zirconium dichloride, cyclohexylidene(cyclopentadienyl)(fluorenyl)zirconium dichloride, diisopropylmethylene(2,5-dimethylcyclopentadienyl)(fluorenyl)zirconium dichloride, isopropyl(cyclopentadienyl)(fluorenyl)-hafnium dichloride, diphenylmethylene (cyclopentadienyl)-(fluorenyl)hafnium dichloride, diusopropylmethylene-(cyclopentadienyl)(fluorenyl)hafnium dichloride, diIsobutylmethylene (cyclopentadienyl)(fluorenyl)hafnium dichloride, ditertbutylmethylene(cyclopentadienyl)-(fluorenyl)hafnium dichloride, cyclohexylidene(cyclopentadienyl)(fluorenyl) hafnium dichloride, diisopropylmethylene(2,5-dimethylcyclopentadienyl)(fluorenyl)hafnium dichloride, isopropyl(cyclopentadienyl)(fluorenyl)titanium dichloride, diphenylmethylene(cyclopentadienyl)(fluorenyl)titanium dichloride, diisopropylmethylene(cyclopentadienyl)-(fluorenyl)titanium dichloride, diisobutylmethylene-(cyclopentadienyl)(fluorenyl)titanium dichloride, ditertbutylmethylene(cyclopentadienyl)(fluorenyl)titanium dichloride, cyclohexylidene(cyclopentadienyl)(fluorenyl) titanium dichloride, diisopropylmethylene(2,5 dimethylcyclopentadienyl)(fluorenyl)titanium dichloride, racemic-ethylene bis(1-indenyl)zirconium (IV) dichloride, racemic-ethylene bis(4,5,6,7-tetrahydro-1-indenyl) zirconium (IV) dichloride, racemic-dimethylsilyl bis(1-indenyl)zirconium (IV) dichloride, racemic-dimethylsilyl bis(4,5,6,7-tetrahydro-1-indenyl)zirconium (IV) dichloride, racemic-1,1,2,2-tetramethylsilanylene bis(1-indenyl) zirconium (IV) dichloride, racemic-1,1,2,2-tetramethylsilanylene bis(4,5,6,7-tetrahydro-1-indenyl) zirconium (IV), dichloride, ethylidene (1-indenyl tetramethylcyclopentadienyl)zirconium (IV) dichloride, racemic-dimethylsilyl bis(2-methyl-4-t-butyl-1-cyclopentadienyl)zirconium (IV) dichloride, racemic-ethylene bis(1-indenyl)hafnium (IV) dichloride, racemic-ethylene bis(4,5,6,7-tetrahydro-1-indenyl)hafnium (IV)

dichloride, racemic-dimethylsilyl bis(1-indenyl)hafnium (IV) dichloride, racemic-dimethylsilyl bis(4,5,6,7-tetrahydro-1-indenyl)hafnium (IV) dichloride, racemic-1,1,2,2-tetramethylsilanylene bis(1-indenyl)hafnium (IV) dichloride, racemic-1,1,2,2-tetramethylsilanylene bis(4,5,6,7-tetrahydro-1-indenyl)hafnium (IV), dichloride, ethylidene (1-indenyl-2,3,4,5-tetramethyl-1-cyclopentadienyl)hafnium (IV) dichloride, racemic-ethylene bis(1-indenyl)titanium (IV) dichloride, racemic-ethylene bis(4,5,6,7-tetrahydro-1-indenyl)titanium (IV) dichloride, racemic-dimethylsilyl bis(1-indenyl)titanium (IV) dichloride, racemic-dimethylsilyl bis(4,5,6,7-tetrahydro-1-indenyl)titanium (IV) dichloride, racemic-1,1,2,2-tetramethylsilanylene bis(1-indenyl) titanium (IV) dichloride racemic-1,1,2,2-tetramethylsilanylene bis(4,5,6,7-tetrahydro-1-indenyl) titanium (IV) dichloride, and ethylidene(1-indenyl-2,3,4,5-tetramethyl-1-cyclopentadienyl)titanium IV) dichloride.

Another type of single site catalyst for use in the invention is a complex of a transition metal, a substituted or unsubstituted pi-bonded ligand, and one or more heteroallyl moieties, such as those described in U.S. Pat. No. 5,527,752. Preferably, such complexes have one of the following formulas:

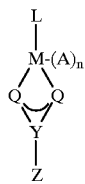

(V)

wherein:

M is a transition metal, preferably Zr or Hf;

L is a substituted or unsubstituted, pi-bonded ligand coordinated to M, preferably a cycloalkadienyl ligand;

each Q is independently selected from the group consisting of —O—, —NR—, —CR$_2$ and —S—, preferably oxygen;

Y is either C or S, preferably carbon;

Z is selected from the group consisting of —OR, —NR$_2$, —CR$_3$, —SR, —SiR$_3$, —PR$_2$, —H, and substituted or unsubstituted aryl groups, with the proviso that when Q is —NR— then Z is selected from the group consisting of —OR, —NR$_2$, —SR, —SiR$_3$, —PR$_2$ and —H, preferably Z is selected from the group consisting of —OR, —CR$_3$ and —NR$_2$;

n is 1 or 2;

A is a univalent anionic group when n is 2 or A is a divalent anionic group when n is 1, preferably A is a carbamate, carboxylate, or other heteroallyl moiety described by the Q, Y and Z combination; and each R is independently a group containing carbon, silicon, nitrogen, oxygen, and/or phosphorus where one or more R groups may be attached to the L substituent, preferably R is a hydrocarbon group containing from 1 to 20 carbon atoms, most preferably an alkyl, cycloalkyl, or an aryl group and one or more may be attached to the L substituent;

or

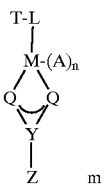

(VI)

wherein:

M is a transition metal, preferably Zr or Hf;

L is a substituted or unsubstituted, pi-bonded ligand coordinated to M, preferably a cycloalkadienyl ligand;

each Q is independently selected from the group consisting of —O—, —NR—, —CR$_2$— and —S—, preferably oxygen;

Y is either C or S, preferably carbon;

Z is selected from the group consisting of —OR, —NR$_2$, —CR$_3$, —SR, —SiR$_3$, —PR$_2$, —H, and substituted or unsubstituted aryl groups, with the proviso that when Q is —NR— then Z is selected from the group consisting of —OR, —NR$_2$, —SR, —SiR$_3$, —PR$_2$, —H, and substituted or unsubstituted aryl groups, preferably Z is selected from the group consisting of —OR, —CR$_3$ and —NR$_2$;

n is 1 or 2;

A is a univalent anionic group when n is 2 or A is a divalent anionic group when n is 1, preferably A is a carbamate, carboxylate, or other heteroallyl moiety described by the Q, Y and Z combination;

each R is independently a group containing carbon, silicon, nitrogen, oxygen, and/or phosphorus where one or more R groups may be attached to the L substituent, preferably R is a hydrocarbon group containing from 1 to 20 carbon atoms, most preferably an alkyl, cycloalkyl, or an aryl group and one or more may be attached to the L substituent;

T is a bridging group selected from the group consisting of alkylene and arylene groups containing from 1 to 10 carbon atoms optionally substituted with carbon or heteroatoms, germanium, silicone and alkyl phosphine; and m is 2 to 7, preferably 2 to 6, most preferably 2 or 3.

In formulas IV and V, the supportive substituent formed by Q, Y and Z is a unicharged polydentate ligand exerting electronic effects due to its high polarizability, similar to the cyclopentadienyl group. In the most preferred embodiments of this invention, the disubstituted carbamates,

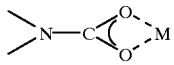

and the carboxylates

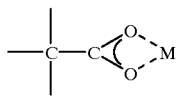

are employed.

Examples of complexes according to formulas (V and VI) include indenyl zirconium tris(diethylcarbamate), indenyl zirconium tris(trimethylacetate), indenyl zirconium tris(p-toluate), indenyl zirconium tris(benzoate), (1-methylindenyl)zirconium tris(trimethylactate), (2-methylindenyl)zirconium tris(diethylcarbamate), (methylcyclopentadienyl)zirconium tris(trimethylacetate), cyclopentadienyl tris(trimethylacetate), tetrahydroindenyl zirconium tris(trimethylacetate), and (pentamethylcyclopentadienyl)zirconium tris(benzoate). Preferred examples are indenyl zirconium tris (diethylcarbamate), indenyl zirconium tris (trimethylacetate), and (methylcyclopentadienyl)zirconium tris(trimethylacetate).

One method of manufacturing a preferred catalyst precursor, indenyl zirconium tris(diethylcarbamate), is to first react a source of cycloalkadienyl ligand with a metal compound of the formula $M(NR_2)_4$, in which M and R are defined above, to introduce the cycloalkadienyl ligand onto the metal compound. The resulting product is then dissolved in an inert solvent, such as toluene, and the heterocumulene $CO_2$ is contacted with the dissolved product to insert into one or more $M-NR_2$ bonds to form a carbamate.

Another type of single site catalyst that can be used in accordance with the invention is a constrained geometry catalyst of the formula:

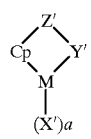

(VII)

wherein:

M is a metal of groups IIIB to VIII of the Periodic Table;

Cp is a cyclopentadienyl or substituted cyclopentadienyl group bound in an $\eta^5$ mode to M;

Z' is a moiety comprising boron, or a member of group IVB of the Periodic Table and optionally sulfur or oxygen, the moiety having up to 20 non-hydrogen atoms, and optionally Cp and Z' together form a fused ring system;

X' is an anionic ligand group or a neutral Lewis base ligand group having up to 30 non-hydrogen atoms;

a is 0, 1, 2, 3 or 4 depending on the valence of M; and

Y' is an anionic or non-anionic ligand group bonded to Z' and M and is nitrogen, phosphorus, oxygen or sulfur having up to 20 non-hydrogen atoms, and optionally Y' and Z' together form a fused ring system.

Constrained geometry catalysts are well known to those skilled in the art and are disclosed in, for example, U.S. Pat. Nos. 5,026,798 and 5,055,438 and published European Application No. 0 416 815 A2.

Illustrative but non-limiting examples of substituents Z', Cp, Y', X' and M in formula VI are:

| Z' | Cp | Y' | X' | M |
|---|---|---|---|---|
| dimethyl-silyl | cyclopentadienyl | t-butylamido | chloride | titanium |
| methyl-phenylsilyl | fluorenyl | phenylamido | methyl | zirconium |
| diphenyl-silyl | indenyl | cyclohexylamido | | hafnium |

-continued

| Z' | Cp | Y' | X' | M |
|---|---|---|---|---|
| tetramethyl-ethylene | | | oxo | |
| ethylene | tetramethyl-cyclopenta-dienyl | | | |
| diphenyl-methylene | | | | |

The invention is also useful with another class of single site catalysts, di(imine) metal complexes, as described in PCT Application No. WO 96/23010. Such di(imine) metal complexes are transition metal complexes of bidentate ligands selected from the group consisting of:

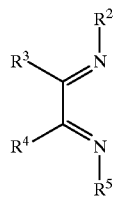

(VIII)

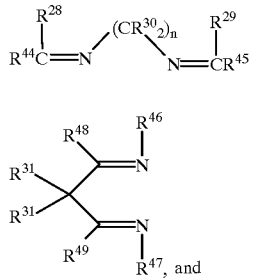

(IX)

(X)

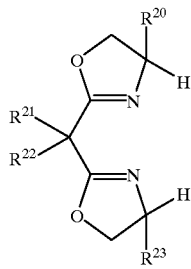

(XI)

wherein said transition metal is selected from the group consisting of Ti, Zr, Sc, V, Cr, a rare earth metal, Fe, Co, Ni, and Pd;

$R^2$ and $R^5$ are each independently hydrocarbyl or substituted hydrocarbyl, provided that the carbon atom bound to the imino nitrogen atom has at least two carbon atoms bound to it;

$R^3$ and $R^4$ are each independently hydrogen, hydrocarbyl, substituted hydrocarbyl, or $R^3$ and $R^4$ taken together are hydrocarbylene or substituted hydrocarbylene to form a carbocyclic ring;

$R^{44}$ is hydrocarbyl or substituted hydrocarbyl, and $R^{28}$ is hydrogen, hydrocarbyl or substituted hydrocarbyl or $R^{44}$ and $R^{28}$ taken together form a ring;

$R^{45}$ is hydrocarbyl or substituted hydrocarbyl, and $R^{29}$ is hydrogen, substituted hydrocarbyl or hydrocarbyl, or $R^{45}$ and $R^{29}$ taken together form a ring;

each $R^{30}$ is independently hydrogen, substituted hydrocarbyl or hydrocarbyl, or two of $R^{30}$ taken together form a ring;

each $R^{31}$ is independently hydrogen, hydrocarbyl or substituted hydrocarbyl;

$R^{46}$ and $R^{47}$ are each independently hydrocarbyl or substituted hydrocarbyl, provided that the carbon atom bound to the imino nitrogen atom has at least two carbon atoms bound to it;

$R^{48}$ and $R^{49}$ are each independently hydrogen, hydrocarbyl, or substituted hydrocarbyl;

$R^{20}$ and $R^{23}$ are independently hydrocarbyl or substituted hydrocarbyl;

$R^{21}$ and $R^{22}$ are independently hydrogen, hydrocarbyl or substituted hydrocarbyl; and n is 2 or 3;

and provided that:

said transition metal also has bonded to it a ligand that may be displaced by or added to the olefin monomer being polymerized; and when the transition metal is Pd, said bidentate ligand is (VIII), (X) or (XI).

The single site catalyst is introduced into the polymerization reactor as a liquid, i.e., in homogeneous, unsupported form, as described in U.S. Pat. No. 5,317,036. As used herein, "liquid" includes liquid single site catalyst, solution (s) or dispersions thereof in the same or different solvent(s), and combinations thereof. One preferred way to use the single site catalyst is as a solution in a hydrocarbon solvent such as Kaydol.

The activating cocatalyst is capable of activating the Ziegler-Natta catalyst and the single site catalyst. Preferably, the activating cocatalyst comprises at least one branched or cyclic oligomeric poly(hydrocarbylaluminum oxide)s that contain repeating units of the general formula —(Al(R*)O)—, where R* is hydrogen, an alkyl radical containing from 1 to about 12 carbon atoms, or an aryl radical such as a substituted or unsubstituted phenyl or naphthyl group. More preferably the activating cocatalyst is methylaluminoxane or modified methylaluminoxane.

The activating cocatalyst may optionally also comprise one or more aluminum alkyls of the formula $AlR_3$, wherein each R is independently an alkyl having 1 to about 14 carbon atoms, such as trilsobutylaluminum, trihexylaluminum, diisobutylhexylaluminum, isobutyldihexylaluminum, trimethylaluminum, triethylaluminum, tripropylaluminum, triisopropylaluminum, tri-n-butylaluminum, trioctylaluminum, tridecylaluminum and tridodecylaluminum, or aluminum alkyl halides such as diethylaluminum chloride.

The activating cocatalyst may also optionally comprise one or more a) an ionic salts of the general formula $[A^+][BR^{}_4-]$, where $A^+$ is a cationic Lewis or Bronsted acid capable of abstracting an alkyl, halogen, or hydrogen from the single site catalyst, B is boron, and R is a substituted, aromatic hydrocarbon, preferably a perfluorophenyl radical or b) boron alkyls of the general formula $BR^{}_3$, where R is as defined above. Ionic salts of the general formula $[A^+][BR^{**}_4-]$ and boron alkyls can optionally be used with alkylating agents such as alkyl aluminum and alkyl lithium compounds.

In one embodiment, the catalyst composition comprises an aluminum alkyl and an aluminoxane. In particular, the catalyst composition comprises an aluminum alkyl and an aluminoxane, wherein the aluminoxane is supported on an inert carrier along with the Ziegler-Natta catalyst and the aluminum alkyl is a liquid.

The mole ratio of single site catalyst to Ziegler-Natta catalyst introduced into the polymerization reactor may vary over a wide range. Typically, the mole ratio of single site catalyst to Ziegler-Natta catalyst is 0.01 to 100, preferably 0.1 to 10, more preferably 0.15 to 5. Moreover, when the catalyst composition is introduced continuously into the polymerization reactor, the mole ratio of Ziegler-Natta catalyst to single site catalyst can be easily controlled due to the fact that the single site catalyst is in liquid form. The flow rate of single site catalyst is merely changed as desired. This allows for simple, continuous control of polymer properties.

The mole ratio of the combination of the Ziegler-Natta catalyst and single site catalyst to total activating cocatalyst is generally in the range of about 0.0001 to about 0.1, preferably about 0.0005 to about 0.05, more preferably about 0.001 to about 0.03.

Once activated, the catalyst composition may be used for the polymerization of olefins by any suspension, solution, slurry, or gas phase process, using known equipment and reaction conditions, and is not limited to any specific type of reaction system. Generally, olefin polymerization temperatures range from about 0° C. to about 200° C. at atmospheric, subatmospheric, or superatmospheric pressures. Slurry or solution polymerization processes may utilize subatmospheric or superatmospheric pressures and temperatures in the range of about 40° C. to about 110° C. A useful liquid phase polymerization reaction system is described in U.S. Pat. No. 3,324,095. Liquid phase reaction systems generally comprise a reactor vessel to which olefin monomer and catalyst composition are added, and which contains a liquid reaction medium for dissolving or suspending the polyolefin. The liquid reaction medium may consist of the bulk liquid monomer or an inert liquid hydrocarbon that is nonreactive under the polymerization conditions employed. Although such an inert liquid hydrocarbon need not function as a solvent for the catalyst composition or the polymer obtained by the process, it usually serves as solvent for the monomers employed in the polymerization. Among the inert liquid hydrocarbons suitable for this purpose are isopentane, hexane, cyclohexane, heptane, benzene, toluene, and the like. Reactive contact between the olefin monomer and the catalyst composition should be maintained by constant stirring or agitation. The reaction medium containing the olefin polymer product and unreacted olefin monomer is withdrawn from the reactor continuously. The olefin polymer product is separated, and the unreacted olefin monomer and liquid reaction medium are recycled into the reactor.

Preferably, gas phase polymerization is employed, with superatmospheric pressures in the range of 1 to 1000 psi, preferably 50 to 400 psi, most preferably 100 to 300 psi, and temperatures in the range of 30 to 130° C., preferably 65 to 110° C. Stirred or fluidized bed gas phase reaction systems are particularly useful. Generally, a conventional gas phase, fluidized bed process is conducted by passing a stream containing one or more olefin monomers continuously through a fluidized bed reactor under reaction conditions and in the presence of the catalyst composition at a velocity sufficient to maintain a bed of solid particles in a suspended condition. A stream containing unreacted monomer is withdrawn from the reactor continuously, compressed, cooled, optionally fully or partially condensed as disclosed in U.S. Pat. Nos. 4,528,790 and 5,462,999, and recycled to the reactor. Product is withdrawn from the reactor and make-up monomer is added to the recycle stream. As desired for temperature control of the system, any gas inert to the catalyst composition and reactants may also be present in the gas stream. In addition, a fluidization aid such as carbon black, silica, clay, or talc may be used, as disclosed in U.S. Pat. No. 4,994,534.

Polymerization may be carried out in a single reactor or in two or more reactors in series, and is conducted substantially in the absence of catalyst poisons. Organometallic compounds may be employed as scavenging agents for poisons to increase the catalyst activity. Examples of scavenging agents are metal alkyls, preferably aluminum alkyls, most preferably triisobutylaluminum.

Conventional adjuvants may be included in the process, provided they do not interfere with the operation of the catalyst composition in forming the desired polyolefin. Hydrogen or a metal or non-metal hydride, e.g., a silyl hydride, may be used as a chain transfer agent in the process. Hydrogen may be used in amounts up to about 10 moles of hydrogen per mole of total monomer feed.

Polyolefins that may be produced according to the invention include, but are not limited to, those made from olefin monomers such as ethylene and linear or branched higher alpha-olefin monomers containing 3 to about 20 carbon atoms. Homopolymers or interpolymers of ethylene and such higher alpha-olefin monomers, with densities ranging from about 0.86 to about 0.95 may be made. Suitable higher alpha-olefin monomers include, for example, propylene, 1-butene, 1-pentene, 1-1-hexene, 4-methyl-1-pentene, 1-octene, and 3,5,5-trimethyl-1-1-hexene. Olefin polymers according to the invention may also be based on or contain conjugated or non-conjugated dienes, such as linear, branched, or cyclic hydrocarbon dienes having from about 4 to about 20, preferably 4 to 12, carbon atoms. Preferred dienes include 1,4-pentadiene, 1,5-hexadiene, 5-vinyl-2-norbornene, 1,7-octadiene, vinyl cyclo1-hexene, dicyclopentadiene, butadiene, isobutylene, isoprene, ethylidene norbornene and the like. Aromatic compounds having vinyl unsaturation such as styrene and substituted styrenes, and polar vinyl monomers such as acrylonitrile, maleic acid esters, vinyl acetate, acrylate esters, methacrylate esters, vinyl trialkyl silanes and the like may be polymerized according to the invention as well. Specific polyolefins that may be made according to the invention include, for example, polyethylene, polypropylene, ethylene/propylene rubbers (EPR's), ethylene/propylene/diene terpolymers (EPDM's), polybutadiene, polyisoprene and the like.

All references mentioned in this disclosure are incorporated by reference.

The following examples further illustrate the invention.

EXAMPLES

Glossary

Activity was measured in g polyethylene/mmol metal.hr.100 psi ethylene.

PDI is Polydispersity Index, equivalent to Molecular Weight Distribution ($M_w/M_n$), as determined by gel permeation chromatography using crosslinked polystyrene columns; pore size sequence: 1 column less than 1000 Å, 3 columns of mixed $5\times10^7$ Å; 1,2,4-trichlorobenzene solvent at 140° C. with refractive index detection.

BuCpZ is bis(n-butylcyclopentadienyl)zirconium dichloride, available from Albemarle Corporation.

Ti Catalyst is $TiAl_{0.3}Mg_3Cl_{10}(THF)_{8.5}$, supported on silica.

MAO is methylalumoxane in toluene, available from Albemarle Corporation.

MMAO is modified methylalumoxane (type 3A) in heptane, available from Akzo Corporation.

DMSBZ is dimethylsilyl bis(cyclopentadienyl)zirconium dichloride, available from Boulder Scientific Company.

SIZR-2 is dimethylsilyl bis(2-methylindenyl)zirconium dichloride, available from Boulder Scientific Company.

Examples 1–7

In each of Examples 1–7, polyethylene was produced in a slurry phase reactor using a catalyst composition containing a combination of a solid Ziegler-Natta catalyst and a liquid single site catalyst in toluene or Kaydol, with methylaluminoxane (MAO) or modified methylaluminoxane (MMAO) as an activating cocatalyst.

For each of Examples 1–7, a slurry of solid Ziegler-Natta catalyst and liquid single site catalyst in toluene or Kaydol of a chosen molar ratio was prepared. An aliquot of this slurry was added to a 6 ounce bottle containing 100 ml of hexane and a measured amount of MAO or modified MAO. Hexene-1 was added to the pre-mixed catalyst composition. Anhydrous conditions were maintained. Table 1 below shows the catalyst composition makeup for Examples 1–7.

The slurry reactor was a 1 liter, stainless steel autoclave equipped with a mechanical agitator. The reactor first was dried by heating at 96° C. under a stream of dry nitrogen for 40 minutes. After cooling the reactor to 50° C., 500 ml of hexane were added to the reactor, and the reactor components were stirred under a gentle flow of nitrogen. The pre-mixed catalyst composition was then transferred to the reactor under a stream of nitrogen and the reactor was sealed. The temperature of the reactor was gradually raised to 60° C. and the reactor was pressured with a desired amount of hydrogen. The temperature was then raised to 75° C. and the reactor was pressured to 150 psi with ethylene. Heating was continued until a polymerization temperature of 85° C. was attained. Polymerization was continued for 30 minutes, during which time ethylene was continually added to the reactor to maintain a constant pressure. At the end of 30 minutes, the reactor was vented and opened.

Table 1 gives the molecular weight distributions of the various polymers made in Examples 1–7. The molecular weight distributions were generally broad, and for a given combination of solid Ziegler-Natta and liquid single site catalysts the use of different kind of MAO cocatalyst and/or different ratios of MAO cocatalyst to catalyst resulted in alternation of molecular weight distribution.

Comparative Examples 8–9

In Examples 8–9, polyethylene was produced under conditions similar to those of Examples 1–7 with the exception that only solid Ziegler-Natta catalyst was employed in combination with MAO or MMAO. The polyethylene produced had relatively narrow molecular weight distribution.

Comparative Examples 10–11

In Examples 10–11, polyethylene was produced under conditions similar to those of Examples 1–7 with the exception that only liquid single site catalyst in toluene was used in combination with MAO or MMAO. The polyethylene produced with these compositions exhibited narrow molecular weight distributions.

Comparative Example 12

In Example 12, polyethylene was produced under conditions similar to that of Example 2 with the exception that the catalyst composition comprised bis(n-butylcyclopentadienyl)zirconium dichloride preactivated with MAO (Al/Zr=200) and supported on Davison 955 silica (previously dried at 600° C.) along with the supported Ziegler-Natta, Ti catalyst.

Examples 13–14

In each of Examples 13 and 14, polyethylene was produced in a horizontally mixed gas phase reactor system. A detailed description of the reactor configuration can be found in U.S. Pat. No. 5,317,036. In each of Examples 13 and 14, a slurry of solid Ziegler-Natta catalyst and liquid single site catalyst in Kaydol of a chosen molar ratio was prepared. This mixture was preactivated with modified methylaluminoxane (MMAO) before being introduced into the polymerization reactor using a feeding apparatus similar to that described in U.S. Pat. No. 5,317,036. Table 2 gives the catalyst compositions used as well as the molecular weight distributions of the various polymers made, which were broad.

TABLE 1

| Example | SSC | Z-N | SSC/Z-N | Cocatalyst | Cocat/(SSC + Z-N) | H2 (ml) | 1-Hexene (ml) | Activity | PDI |
|---|---|---|---|---|---|---|---|---|---|
| 1 | BuCpZ | Ti Catalyst | 0.15 | MAO | 175 | 150 | 20 | 13917 | 7.9 |
| 2 | BuCpZ | Ti Catalyst | 0.15 | MAO | 348 | 150 | 20 | 10227 | 12.2 |
| 3 | BuCpZ | Ti Catalyst | 0.15 | MMAO | 35 | 150 | 20 | 12042 | 5.6 |
| 4 | BuCpZ | Ti Catalyst | 0.15 | MMAO | 175 | 150 | 20 | 12135 | 6.3 |
| 5 | BuCpZ | Ti Catalyst | 0.15 | MMAO | 348 | 150 | 20 | 11129 | 9.7 |
| 6 | DMSBZ | Ti Catalyst | 0.45 | MAO | 465 | 300 | 20 | 6793 | 18 |
| 7 | SIZR-2 | Ti Catalyst | 0.15 | MAO | 175 | 750 | 20 | 7820 | 5.9 |
| 8* | | Ti Catalyst | | MAO | 200 | 600 | 60 | 10018 | 3.4 |
| 9* | | Ti Catalyst | | MMAO | 200 | 600 | 60 | 10912 | 3.9 |
| 10* | BuCpZ | | | MAO | 1500 | 0 | 20 | 81784 | 2.4 |
| 11* | BuCpZ | | | MMAO | 1500 | 0 | 20 | 51930 | 2.3 |
| 12* | supported BuCpZ | Ti Catalyst | 0.12 | MAO | 275 | 150 | 20 | 8928 | 12.8 |

*Comparative

TABLE 2

| Example | SSC (solution) | Z-N (supported) | SSC/Z-N | Cocatalyst | Cocat/(SSC + Z-N) | H2/(C2) | C6/C2 | ppm (Zr/Ti) | PDI |
|---|---|---|---|---|---|---|---|---|---|
| 13 | BuCpZ | Ti Catalyst | 0.17 | MMAO | 200 | 0 | 0.05 | (1/3) | 14.1 |
| 14 | BuCpZ | Ti Catalyst | 0.17 | MMAO | 200 | 0.005 | 0.05 | (1/3) | 18.8 |

What is claimed is:

1. A catalyst composition for the polymerization of olefins, comprising: a) a solid Ziegler-Natta catalyst; b) a liquid single site catalyst; and c) at least one activating cocatalyst wherein the Ziegler-Natta catalyst has the formula:

wherein ED is an electron donor; $0.5 \leq m \leq 56$; n is 0, 1, or 2; $2 \leq p \leq 116$; $2 \leq q \leq 85$; R is a $C_1$ to $C_{14}$ aliphatic or aromatic hydrocarbon radical or COR' wherein R' is a $C_1$ to $C_{14}$ aliphatic or aromatic hydrocarbon radical; and X is selected from the group consisting of Cl, Br, I, and mixtures thereof, and the single site catalyst has the formula:

wherein M is a metal from groups IIIB to VIII or a rare earth metal of the Periodic Table; L and L' are the same or different and are π-bonded ligands coordinated to M; $R^1$ is selected from the group consisting of $C_1$ to $C_4$ substituted or unsubstituted alkylene radicals, dialkyl or diaryl germanium or silicon groups, and alkyl or aryl phosphine or amine radicals bridging L and L'; each X is independently hydrogen or an aryl, alkyl, alkenyl, alkylaryl, or arylalkyl radical having 1 to 20 carbon atoms, or a hydrocarboxy radical having 1 to 20 carbon atoms; y is 0, 1, or 2; x is 1, 2, 3, or 4 depending upon the valence state of M; z is 0 or 1 and is 0 when y is 0; and $x-y \geq 1$.

2. The catalyst composition of claim 1 wherein the activating cocatalyst comprises an aluminum alkyl and an aluminoxane.

3. The catalyst composition of claim 2 wherein the aluminoxane is supported on an inert carrier with the Ziegler-Natta catalyst, and the aluminum alkyl is a liquid.

4. A process for the production of olefin polymers, which comprises contacting at least one olefin monomer under polymerization conditions with a catalyst composition comprising a) a solid Ziegler-Natta catalyst; b) a liquid single site catalyst; and c) at least one activating cocatalyst wherein the Ziegler-Natta catalyst has the formula:

wherein ED is an electron donor; $0.5 \leq m \leq 56$; n is 0, 1, or 2; $2 \leq p \leq 116$; $2 \leq q \leq 85$; R is a $C_1$ to $C_{14}$ aliphatic or aromatic hydrocarbon radical, or COR' wherein R' is a $C_1$ to $C_{14}$ aliphatic or aromatic hydrocarbon radical; and X is selected from the group consisting of Cl, Br, I, and mixtures thereof, and the single site catalyst has the formula:

wherein M is a metal from groups IIIB to VIII or a rare earth metal of the Periodic Table; L and L' are the same or different and are π-bonded ligands coordinated to M; $R^1$ is selected from the group consisting of $C_1$ to $C_4$ substituted or unsubstituted alkylene radicals, dialkyl or diaryl germanium or silicon groups, and alkyl or aryl phosphine or amine radicals bridging L and L'; each X is independently hydrogen, an aryl, alkyl, alkenyl, alkylaryl, or arylalkyl radical having 1 to 20 carbon atoms, or a hydrocarboxy radical having 1 to 20 carbon atoms; y is 0, 1, or 2; x is 1, 2, 3, or 4 depending upon the valence state of M; z is 0 or 1 and is 0 when y is 0; and x−y≧1.

5. The process of claim 4 wherein the activating cocatalyst comprises an aluminum alkyl and an aluminoxane.

6. The catalyst composition of claim 5 wherein the aluminoxane is supported on an inert carrier with the Ziegler-Natta catalyst, and the aluminum alkyl is a liquid.

* * * * *

Dedication 6,136,747—Sun-Chueh Kao; Frederick John Karol, both of Bellp Mead, N.J.; Paul Theodore Daniell, Tornado; Gregory Mark Goode Hurricane, both of W. VA. MIXED CATAYLST COMPOSITION FOR THE PRODUCTION OF OLEFIN POLYMERS. Patent dated October 24, 2000. Dedication filed August 15, 2002, by the Assignee, Union Carbide Chemicals & Plastics Tech. Corporation.

Hereby dedicates to the Public, all claims of said patent.

*(Official Gazette, July 22, 2003)*